(12) United States Patent
Breu

(10) Patent No.: US 8,983,725 B2
(45) Date of Patent: Mar. 17, 2015

(54) METHOD FOR WARNING THE DRIVER OF A MOTOR VEHICLE OF AN IMPENDING HAZARDOUS SITUATION DUE TO ACCIDENTAL DRIFTING INTO AN OPPOSING TRAFFIC LANE

(71) Applicant: Audi AG, Ingolstadt (DE)

(72) Inventor: Alexander Breu, Weiding (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/787,218

(22) Filed: Mar. 6, 2013

(65) Prior Publication Data

US 2013/0238192 A1 Sep. 12, 2013

(30) Foreign Application Priority Data

Mar. 7, 2012 (DE) .......................... 10 2012 004 791

(51) Int. Cl.
| | |
|---|---|
| G08G 1/16 | (2006.01) |
| B60K 37/06 | (2006.01) |
| B62D 15/02 | (2006.01) |
| G01S 13/72 | (2006.01) |

(Continued)

(52) U.S. Cl.
CPC .............. *G08G 1/166* (2013.01); *B60K 37/06* (2013.01); *B62D 15/025* (2013.01); *B62D 15/0265* (2013.01); *B62D 15/029* (2013.01); *G01S 13/726* (2013.01); *G01S 13/867* (2013.01); *B60K 2350/102* (2013.01); *G01S 13/931* (2013.01); *G01S 2007/4091* (2013.01); *G01S 2013/9342* (2013.01); *G01S 2013/9346* (2013.01); *G01S 2013/9353* (2013.01); *G01S 2013/9357* (2013.01); *G01S 2013/936* (2013.01); *G01S 2013/9375* (2013.01)

USPC ............................................. 701/41; 701/301

(58) Field of Classification Search
CPC ...... B60Q 9/008; B60R 11/04; G01S 13/931; G08G 1/16; B60T 7/22
USPC ...................... 701/41–44, 300–302
See application file for complete search history.

(56) References Cited

U.S. PATENT DOCUMENTS

| | | | |
|---|---|---|---|
| 6,256,584 B1 | 7/2001 | Kodaka et al. | |
| 6,269,307 B1 * | 7/2001 | Shinmura et al. | ............. 701/301 |

(Continued)

FOREIGN PATENT DOCUMENTS

| | | |
|---|---|---|
| DE | 103 26 358 A1 | 12/2004 |
| DE | 10 2004 057 060 A1 | 6/2006 |

(Continued)

*Primary Examiner* — Mary Cheung
*Assistant Examiner* — Rodney Butler
(74) *Attorney, Agent, or Firm* — Henry M. Feiereisen LLC

(57) ABSTRACT

A method for warning the driver of a motor vehicle of an impending hazardous situation caused by accidental drifting towards or into an opposing traffic lane includes determining a virtual vehicle path of the own motor vehicle and a lane marker separating the lane of the own motor vehicle from the opposing traffic lane, determining a relative position of the own motor vehicle in relation to the lane marker, checking whether an oncoming vehicle enters or has entered the virtual vehicle path, checking whether the own motor vehicle will cross or has crossed the lane marker, checking for driver activity, and outputting a warning signal or performing an automatic driving mode intervention, when the oncoming vehicle will enter or has entered the virtual vehicle path and the own vehicle will cross or has crossed the lane marker, and when the driver is inactive.

21 Claims, 4 Drawing Sheets

(51) Int. Cl.
*G01S 13/86* (2006.01)
*G01S 13/93* (2006.01)
*G01S 7/40* (2006.01)

(56) References Cited

U.S. PATENT DOCUMENTS

| | | | |
|---|---|---|---|
| 7,424,364 B2* | 9/2008 | Gern et al. | 701/301 |
| 7,660,669 B2* | 2/2010 | Tsuda | 701/301 |
| 7,698,032 B2* | 4/2010 | Matsumoto et al. | 701/36 |
| 7,885,766 B2* | 2/2011 | Sugimoto et al. | 701/301 |
| 7,889,116 B2* | 2/2011 | Harada et al. | 342/59 |
| 7,898,400 B2* | 3/2011 | Hadi et al. | 340/435 |
| 2001/0039471 A1* | 11/2001 | Bienias et al. | 701/96 |
| 2005/0090983 A1* | 4/2005 | Isaji et al. | 701/301 |
| 2005/0273264 A1* | 12/2005 | Gern et al. | 701/301 |
| 2007/0233343 A1* | 10/2007 | Saito et al. | 701/41 |
| 2008/0228400 A1* | 9/2008 | Wheeler | 701/301 |
| 2008/0252482 A1* | 10/2008 | Stopczynski | 340/903 |
| 2009/0033540 A1* | 2/2009 | Breed et al. | 342/29 |
| 2009/0088966 A1* | 4/2009 | Yokoyama et al. | 701/201 |
| 2009/0240400 A1* | 9/2009 | Lachapelle et al. | 701/45 |
| 2010/0104199 A1 | 4/2010 | Zhang et al. | |
| 2010/0188200 A1 | 7/2010 | Hashimoto et al. | |
| 2011/0234390 A1 | 9/2011 | Danner et al. | |
| 2013/0250113 A1* | 9/2013 | Bechtel et al. | 348/148 |
| 2014/0118486 A1* | 5/2014 | Luo et al. | 348/36 |

FOREIGN PATENT DOCUMENTS

| | | |
|---|---|---|
| DE | 10 2006 019 111 A1 | 10/2007 |
| DE | 10 2006 052 469 A1 | 6/2008 |
| DE | 10 2008 005 999 A1 | 7/2009 |
| DE | 10 2009 050 503 A1 | 11/2010 |
| EP | 0 896 918 | 2/1999 |
| EP | 2 302 412 | 3/2011 |
| JP | H 08-203000 | 8/1996 |
| WO | WO 2011/106 578 A2 | 9/2011 |

* cited by examiner

METHOD FOR WARNING THE DRIVER OF A MOTOR VEHICLE OF AN IMPENDING HAZARDOUS SITUATION DUE TO ACCIDENTAL DRIFTING INTO AN OPPOSING TRAFFIC LANE

CROSS-REFERENCES TO RELATED APPLICATIONS

This application claims the priority of German Patent Application, Serial No. 10 2012 004 791.6, filed Mar. 7, 2012, pursuant to 35 U.S.C. 119(a)-(d), the content of which is incorporated herein by reference in its entirety as if fully set forth herein.

BACKGROUND OF THE INVENTION

The invention relates to a method for warning the driver of an impending hazardous situation due to accidental drifting into an opposing traffic lane.

The following discussion of related art is provided to assist the reader in understanding the advantages of the invention, and is not to be construed as an admission that this related art is prior art to this invention.

Occasionally, the driver of a motor vehicle may be momentarily distracted and not observe the traffic, for example, when using a driver assistance system, such as a navigation system, installed in the motor vehicle, whereby he is looking at a screen and not at the road, or when he dials a radio station etc. It may then happen that the vehicle unintentionally drifts to one side and thereby moves in the direction of an adjacent opposing traffic lane. A critical situation may arise when an oncoming vehicle approaches in this opposing traffic lane.

Various driver assistance systems are installed in modern vehicles, which are based on environment sensors such as radar sensors, cameras, etc., for example, a tracking system such as an ACC system (ACC Adapted Cruise Control), a lane departure system such as a heading control system or an LDW system (LDW=Lane Departure Warning), or safety systems, such as a collision warning system (FCW system, FCW=Forward Collision Warning). These systems use the signals provided by the sensors installed in the vehicle. However, they always enable a reaction to a preceding vehicle, when the system is designed to detect in any way the relative position of the own vehicle to that of a preceding vehicle and to react accordingly. DE 10 2004 057 060 A1 discloses to detect an oncoming vehicle in the same lane and to warn the driver. In such a situation, however, the driver of the motor vehicle is usually paying attention, i.e. he himself does not initiate a potentially hazardous situation due to possible inattention.

It would therefore be desirable and advantageous to obviate prior art shortcomings and to provide an improved method, which warns the driver when he inadvertently drifts in the direction of oncoming traffic or into an opposing traffic lane.

SUMMARY OF THE INVENTION

According to one aspect of the invention, a method for warning a driver of a motor vehicle of an impending hazardous situation caused by accidental drifting towards or into an opposing traffic lane, includes determining a virtual vehicle path directed in the travel direction of the own motor vehicle, determining with a first detection sensor a lane marker separating the lane of the own motor vehicle from the opposing traffic lane, determining a relative position of the own motor vehicle in relation to the lane marker, determining an oncoming vehicle traveling on the opposing traffic lane with a second detection sensor, checking whether the oncoming vehicle enters or has entered the virtual vehicle path, checking whether the own motor vehicle will travel across or has traveled across the lane marker based on the determined relative position of the own motor vehicle, checking for presence of sensor information indicating an active travel operation or a steering operation by the driver, thus indicating that the detected relative position of the own motor vehicle is caused by driver activity, and outputting a warning signal or performing an automatic driving mode intervention, or both, when a result of the checking indicates that the oncoming vehicle will enter or has entered into the virtual vehicle path and the own vehicle will cross or has crossed the lane marker, thus making a collision likely, and when the sensor information indicates an absence of an active steering operation by the driver.

The method according to the invention detects, on one hand, a potential collision danger and, on the other hand, whether there are indications for driver inattention and thus inactivity of the driver which would give reason to believe that the driver has caused the potentially hazardous condition unintentionally.

To this end, it must first be determined whether, on one hand, a drift towards the opposing traffic lane exists and, on the other hand, whether a potential collision object is present at that location. To detect a potential collision object, a virtual vehicle path oriented in the direction the own motor vehicle is initially determined. This represents a type of a virtual corridor derived from the current direction of travel of the vehicle, which represents the predicted travel path of the own vehicle. It is thus predicted from the virtual vehicle path how the own vehicle will continue its travel within the next few seconds. Thereafter, it is determined with suitable detection sensors, preferably front-mounted radar sensors, whether an oncoming vehicle is located in the sensor detection range, wherein the detection range is usually wider than the vehicle path. After any existing environment objects have been detected with these detection sensors, even those objects that do not move, objects that move are filtered from the clustered object list, whereby a plausibility check of the actual detection location assigned to an object may also be performed. Because the detection range of the sensors is considerably greater than the predicted vehicle path, is then checked whether a detected object identified as an oncoming vehicle will enter or has entered the virtual vehicle path, i.e. whether a risk of collision generally exists. In this context, a criticality check can be performed for each oncoming traffic object identified as relevant, which can be based on the distance and the state of motion, such as the relative speed and the relative acceleration of the relevant oncoming traffic object, which can be determined from the sensor signals. In addition to the appropriate state variables of the own vehicle, the equations of motion are then calculated and a virtual collision time is predicted, if a general risk for collision exists.

Furthermore, it must be checked whether the own vehicle is ever going to drift in the direction of the opposing traffic lane. To this end, a reliable differentiation is first required between the own traffic lane and an opposing traffic lane, or the reliable detection of an opposing traffic lane. For this purpose, lane marker separating the own lane from the opposing traffic lane is determined by using in particular an optical detection device such as a camera. The determination of such lane marker is a prerequisite that makes a potentially hazardous drift in the direction of oncoming traffic at all possible, since such a hazardous situation can only be recognized as being plausible, when an unambiguous lane differentiation is possible. When such a reliable lane differentiation is possible, i.e. when an unambiguous separating lane marker is identified, it is checked whether the own motor vehicle has a relative position with respect to the lane marker based on its determined position and orientation, which can be measured based on the yaw angle of the vehicle and the direction of the longitudinal axis, respectively, which suggests that the vehicle is in the process of approaching or cross the lane marker, respectively. In other words, the lateral offset (the distance from the driving axis to the line), and the yaw angle differences of the own vehicle to the lane marker must be detected. Ideally, other lane marker attributes or line attributes (the road markers are generally lines), such as the type of the line (dashed, solid), line curvature, line prediction, etc., are detected. Whether a road is traveled on the right or on the left may in this context be determined from a static view of all objects detected with the radar system, so that a plausible assessment can be made that detected lane marker is actually a line dividing the own lane from an opposing traffic lane.

When it is recognized based on the marker information that the own vehicle currently crosses or later intends to cross this relevant lane marker, which points to the opposing travel lane, another essential condition is satisfied for possibly outputting a warning signal or for performing a functional intervention in addition detecting a potential collision object in oncoming traffic.

It must then be checked as a third criterion whether an inactivity situation on the part of the driver exists, i.e. whether the driver is inattentive and did not actively cause the current situation. To this end, it is determined whether or not sensor information of the own vehicle exists which indicates whether an active driving operation, in particular an active steering operation is performed by the driver and thus whether the detected relative position of the vehicle is actively and intentionally attained, which would prevent warning signals from being outputted or a driving intervention from being performed, or whether such an active operation which intentionally causes the situation can be excluded, thus indicating unintentional drifting towards the lane marker and thus towards the oncoming traffic. Different information can be used as this sensor information, as discussed below, which is supplied by various sensors, actuators, etc., respectively, installed in the own vehicle, as long as these sensors and actuators are capable of providing in any way an indication of an existing or absent driver activity.

When the third criterion is also fulfilled, i.e. when inactivity or inattention of the driver is plausible, a warning signal can be outputted, either visually, audible and/or haptic, alternatively or additionally an automatic driving intervention may also occur when warranted by the situation. However, a requirement is that the checks have shown that an oncoming vehicle will enter or has entered the virtual traffic lane, indicating a potential collision risk when travel is continued, and also that the own vehicle will cross or has already crossed the lane marker, making a collision likely, and finally, when the sensor information excludes an active steering operation.

Advantageously, the method according to the invention, which captures a variety of different information or determines the existence of and applies various boundary conditions, offers the opportunity to assist and timely warn the driver in such a potentially hazardous situations so that he can either still actively act on his own, or, when this is no longer possible, start a counter-action through an automatic system intervention. The driving safety can thereby be improved.

According to an advantageous feature of the present invention, the virtual traffic lane, if necessary weighted by distance, may be offset laterally in the direction of the opposing traffic lane. The virtual vehicle path, which is determined over a considerable length, for example about 200 meters (commensurate with the detection range of the radar sensors), is according to this embodiment of the invention quasi extended sideways, i.e. pulled into the opposing traffic lane. The virtual vehicle path has thereby a little wider span. When an oncoming object is located for a specific time period inside this wider virtual vehicle path, meaning the "oncoming traffic corridor", the oncoming object is marked as a relevant oncoming traffic object.

According to an advantageous feature of the invention, the vehicle path may be determined based on environment information relating to stationary environmental objects, in particular barriers or lane markers, detected by sensors, especially by the optical detection device. According to this embodiment according to the invention, the virtual vehicle path and its "spatial position", respectively, is determined based on information relating to stationary objects, meaning it is supported by this information. This is important, since the predicted course of the lane, as determined for example by the yaw rate of the own vehicle and hence the determination of a vehicle path of a "drifting" vehicle, causes also a tendency of the vehicle path to drift. With the support provided by stationary environment object information, the virtual vehicle path, respectively the "oncoming traffic corridor", is prevented from being estimated to be too far to the outside, which would later cause oncoming traffic objects to be incorrectly classified as relevant or irrelevant. In other words, the virtual traffic lane is quasi corrected or aligned based on stationary environment object information. Such stationary environment objects may be, in particular, guard rails, but also other lane markers or lane posts and the like, which can readily be recognized especially with the apron camera. By taking into account such environment information relating to stationary objects, it can be detected, for example, whether the own vehicle travels, when for example two lanes run in the same direction, in the right lane distal from the opposing traffic lane, because it is always known from the environment information, such as the position of a guard rail, that the own vehicle travels at a significant distance from the opposing traffic lane, so that a potentially hazardous situation can be excluded. With this information, the vehicle path can hence be corrected, respectively limited.

According to another advantageous feature of the present invention, for determining whether a collision of the own vehicle with the oncoming vehicle is at all possible, the distance between the vehicles and at least one information describing the relative movement of both vehicles, in particular the relative speed and/or the relative acceleration as well as information describing the movement of the own motor vehicle itself, may be measured and a possible virtual collision time is determined. The potential time of impact must be determined in order to detect a time window that is located between the current time and the virtual time of impact. Because a warning or an intervention is ultimately required only when a so determined time window defines a specific duration or a certain interval, respectively, for example between 1-4 seconds, or between 1.5-3 seconds, and a warning and/or an intervention is required, or possible at all, respectively, only when a potential collision is located in such a time window. A warning does not make sense when a virtual time of impact is determined to occur in 8 or 10 seconds, because this time period is too long, and the driver can be expected within the time to actively intervene. However, when a virtual time of impact is, for example, less than a second, a warning is also not worthwhile due to lack of a potential reaction time. In other words, it is also a necessary condition for a possible warning or an operational intervention, respectively, that the virtual time of impact is smaller than an upper threshold and greater than a lower threshold.

According to another advantageous feature of the present invention, a warning and/or an intervention may only take place when the lane marker separating the own lane from the opposing traffic lane is continuously detected over a predetermined, optionally adaptable period of time. According to this embodiment of this invention, it is therefore checked that a plausible marking state, i.e. a lane marker or dividing line, is detected during a sufficiently long defined time window ahead of a warning or an intervention. A plausible marker or line state is for example characterized in that the marker must not have any jumps or dropouts. Only then can a prior adherence to a lane and a deviation therefrom, i.e. unintentional drifting, be measured.

According to another advantageous feature of the present invention, a warning and/or an intervention may occurs only when within a predetermined or adapted time period no additional marker adjacent to the own travel lane and separating the lane marker from the opposite travel lane is detected. According to this embodiment, is thus detected whether a further marker appears in the area of the previously detected lane marker, which may be the case when a merging lane is delimited, or when the transition to another lane is marked and the like. In such situation, the lane marker state is unclear, since it is not clear which of the lines now actually separates an opposite travel lane from the own lane. This means that the lane marker situation is either not plausible or a lane marker may possibly be crossed to reach another branching lane. Such an additional lane marker can be readily detected by evaluating camera images by establishing a lateral region around the previously determined lane marker, which is continuously evaluated. No second line must then appear in this area within the predetermined or adaptable period of time, because only then is a plausible, unambiguous line position detected, which is also a prerequisite for a potential operational intervention. When this condition is not met, i.e. when the lane marker position is unclear, the system cannot start to operate, similar to when a dropout in the lane markers is detected and the like, the system must begin anew.

According to another advantageous feature of the present invention, an instance of the crossing may be detected, wherein a warning and/or an intervention is possible only from this moment on. Because a potential collision can only occur, when the own vehicle actually crosses the lane marker separating the lanes, it is advantageous to allow the warning or intervention operation only from this instance on, although the preparatory detection of the situation begins of course much earlier.

As already described, a key criterion for issuing a warning signal or performing an intervention is the presence or absence of sensor information that indicates a certain inactivity of the driver. Such sensor information may include, for example, operating a turn signal and/or an accelerator or brake pedal or a steering wheel, all of which would indicate an active action of the driver. A steering angle or a steering angle gradient or a steering torque can also be used as sensor information, since this information also implies an active action, in this case steering, by the driver. Any acceleration values, whether positive or negative, indicate an active acceleration or braking operation, consequently a pedal actuation. Also an actual driving speed within a predetermined, optionally adaptable interval, a time gap representing a distance to a preceding vehicle and/or observing a driver with a camera may be used as corresponding information. When the actual driving speed is, for example, within an allowable speed range of, e.g., 50-120 km/h, it is in principle possible that the driver may be inattentive, because the driver can be assumed to closely monitor the traffic especially at higher speed. A possible distance to a preceding vehicle also indicates driver alertness, because when the driver drives closely behind a preceding vehicle, this usually indicates awareness. An immediate indication of any inattention is of course monitoring of interior vehicle space, which captures the driver, based on which it can be immediately determined when the driver focuses, for example, on the display for operating a navigation system or the like.

All sensor information ultimately contributes to a representation of the driver and his driving behavior and his mental state and are used to determine whether he later needs support, because he is potentially inattentive and can commit driving errors, or whether he does not require support, because he is active and attentive. The elimination of only a single item of information, provided that several are detected by the system, may already be sufficient to essentially restart the system anew, since active steering or active driving, respectively, can then be assumed, in particular when operating the turn signal or actuating a pedal or actively steering. In these situations, the detection operation, meaning the method according to the invention, starts anew after a certain blocking time window has elapsed, which may have a duration of a few seconds.

According to another advantageous feature of the present invention, additional information for determining whether a warning should be issued or an intervention should occur may include a curve radius of the travel lane determined in particular with the optical detection device, a value of the lane width between a defined minimum value and maximum value and/or the actual speed of the oncoming vehicle with respect to a threshold value.

By detecting the curve radius, it can be determined whether the system should always be active, i.e. whether a situation exists in which the system may be of help or not, since a safe assessment of the situation is impossible when the curve radios is too tight. In addition, a corresponding threshold radius can be defined which determines a maximally allowable curvature of a curve so that the system can work effectively.

The lane width should also be determined in this context, in particular with the optical detection device. When traveling on a very narrow road, slight drifting towards the lane marker is of course much more likely than when travelling in a lane having a standard width. When the lane width is within the defined interval, the system can always be active; however, when this is an extremely narrow lane, the operation of the system can be suppressed.

Advantageously, the speed of oncoming traffic may also be considered as information that causes the system to cease operation or to restart, for example when the oncoming traffic moves very fast and in particular the narrow time gap before a virtual impact is very narrow, whereupon the warning strategy can be adjusted accordingly.

Lastly, distance information from an onboard or external database, in particular a navigation system, may be considered as additional information, in response to which a warning is issued or an intervention occurs. For example, the traveled road can be classified by using this route information. When it is determined that the own vehicle is, for example, on a highway, no oncoming traffic is possible, meaning that the method of the invention or the system, respectively, is inactive. A warning or an intervention, respectively, is only allowed on roads with potential oncoming traffic. Also, a conservative approach for determining the relevant lane marker may be selected for roads having a plurality of lanes in the same direction, which in turn can be detected from the route information, and the line type (solid line, broken line) can also be determined from the route information. It can also be determined based on the route information in conjunction with the own vehicle's actual position, whether the vehicle is currently in the area of an on-ramp or exit ramp, an intersection, etc., which in such situations causes the system to cease operation, as those areas are usually characterized by ambiguous lane marker states.

According to another advantageous feature of the present invention, the warning and the intervention itself may be carried out in a cascaded fashion, by outputting in a first stage an optical and/or acoustic warning, preferably a gong actuation and/or an advisory message on the instrument cluster or on the head-up display, by outputting in a second stage a haptic warning, preferably a steering wheel vibration with a variable frequency and/or amplitude that depends on the criticality of the situation, by outputting in a third stage a steering torque that is directed back to the lane center, and by outputting in the fourth stage a braking torque, if necessary separately for each individual wheel, with a tendency back toward the lane center in conjunction with a speed reduction. This cascaded approach may of course be varied depending upon the criticality of the situation and, especially, when the time window before the virtual impact is already very tight, so that optionally an acoustic/optic/haptic warning is outputted, while simultaneously a steering torque and/or a brake torque is applied. In other words, the particular stage is selected depending on the detected danger situation, wherein the stages can be optionally also be applied cumulatively.

In addition to the method, the invention relates also to a motor vehicle, which is configured for performing the method.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
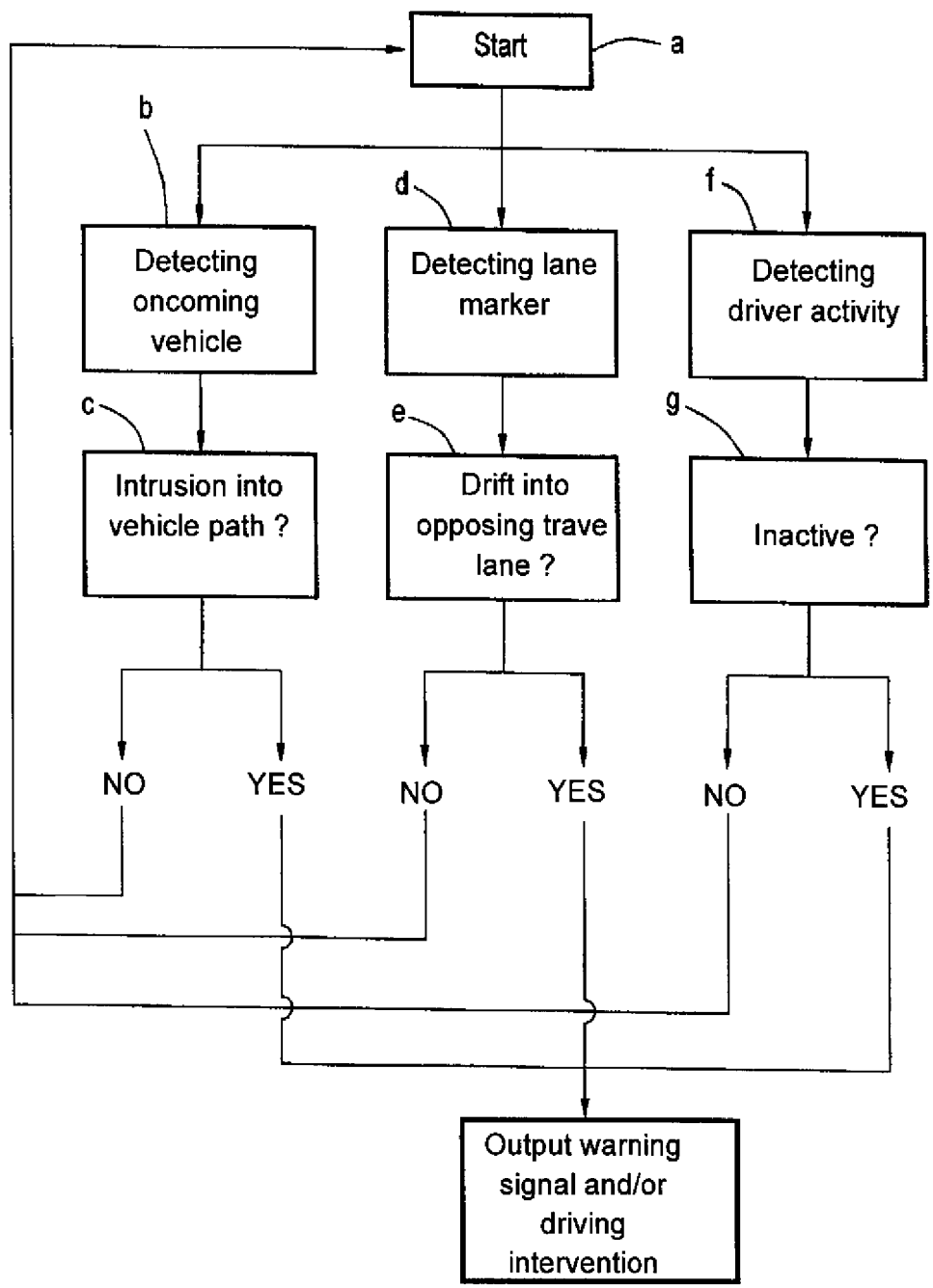
FIG. 1 is a schematic diagram describing the basic process flow of the method according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown in form of a flow chart the basic process flow of the method according to the present invention.

In step a, the operation of the driver assistance system is started—such driver assistance system is implemented in the present example and performs the method according to the invention. Thereafter three different detection processes start, namely, the detection of the presence of any oncoming vehicle, the detection of a relevant lane marker separating the own lane from an opposing traffic lane, and finally the detection of driver activity.

An oncoming vehicle is detected in step b. As described above, a virtual vehicle path is first determined, which is directed in the travel direction of the own motor vehicle and which is optionally expanded laterally, i.e. in the direction of an opposing traffic lane. The vehicle path defines the potential movement corridor in which the own vehicle will be moving in the future. The vehicle path is determined from the orientation and/or the direction of travel, respectively, of the own vehicle as well as any additional information about the steering angle, yaw angle, etc. Thereafter, the area in front of the vehicle is captured using a detection sensor, in particular suitable radar sensors, and it is checked whether an oncoming vehicle is approaching in an opposing traffic lane. Following this step and when the presence of an oncoming vehicle has been confirmed, it is checked in step c whether the oncoming vehicle has entered or is in the process of entering the virtual vehicle path. The detection result of the steps b, c can be either that no oncoming vehicle has been detected and, consequently, no incursion into the vehicle path has been determined, whereupon the process is restarted, and the steps b, c are triggered again. In the event that an oncoming vehicle has been detected and this oncoming vehicle also enters the vehicle path, a positive check result is obtained. This result is the first basic criterion for deciding whether it is necessary to issue a warning signal and/or a driving intervention.

In parallel, see step d, a relevant lane marker is detected, which reliably separates the own lane from an opposing traffic lane on which an oncoming vehicle may move. This is performed with a suitable optical detection device, such as a vehicle apron camera with suitable image analysis, which is capable of capturing lane markers, in particular in the form of lines. If such lane marker is captured with sufficient stability, i.e. detected constantly for a defined extended time period, then it is checked in step e, whether or not the own vehicle, the relative position of which is continuously determined relative to the lane marker, behaves such that it approaches this lane marker, meaning it drifts towards the lane marker and thus is about to drift into the opposing traffic lane. The relative position of the vehicle relative to the lane marker is determined, as described, with reference to the own vehicle's spatial position, in particular the orientation of the vehicle's longitudinal axis or the yaw angle, etc., respectively.

Again, this may produce two different end results. When either no relevant defined lane marker is detected, or when no drift is detected, the system returns to the starting point, i.e. it is ultimately restarted and the steps d, e start again. When the end result is positive, then another decision criterion regarding outputting a warning signal and/or performing a driving intervention is satisfied.

The third line of detection provides according to step f for the detection of the driver activity. In this check it is determined whether the driver is inattentive, i.e. whether a possible drift toward the opposing traffic lane detected in step e is unintentional, because the driver may be distracted, or whether the drift is intentional or the driver is active and has control over the vehicle. This determination is made based on various sensor information detected with different sensors installed in the vehicle. "Sensors" are understood to include all the elements that deliver in any form information that can be analyzed and that allow to record the driver's activity or the driver's condition, respectively. Specifically, this includes the operation of the turn signal or the operation of the accelerator or brake pedal, because activation of the turn signal by the driver is a clear indication that any drift towards the opposing traffic lane is intentional, meaning that the driver wants to pull out or pass. Absence of a turn signal may be a sign for an unconscious drift. The operation of the accelerator or the brake pedal also indicates an active action by the driver, meaning that the driver is attentive and observes the traffic, so that a possible drift is also deliberate and takes place in a controlled fashion. Additional sensor information may be the operation of a steering wheel, the steering angle or the steering angle gradient as well as a steering torque, meaning all information indicating a deliberate sideways movement of the vehicle by the driver. When the driver has moved the steering wheel just before a possible drift is detected, it is obvious that he deliberately initiated the sideways movement.

However, other sensor information can be used as direct vehicle parameters, in particular for example monitoring of the interior space of a vehicle using an interior camera that captures exactly whether the driver is attentive or in which direction he looks, respectively. When it is detected that the driver looks downward and sideways, for example, onto a display or the control panel, it is clear that he does not pay attention to the traffic, and that any drift is probably unintentional.

Overall, a variety of possible information enters into this verification step. This third decision criterion is positive only when this variety of information cumulatively indicates that the driver is inactive, so that it would be warranted to output a warning signal or perform a driving intervention. In the event that even only one of the plurality of the detected sensor signals, i.e. the checked criteria, indicate that the driver is still active, then this check is decided to be negative, and the system returns again to the start or to the step f.

Returning to the start does not mean that a warning signal can be issued or an operational intervention can be performed when a positive decision is made in the respective process step. It is conceivable that with a negative result in even only one checking step, a particular blocking time window is initially initiated, within which—even when the following checks are positive—a warning signal should not be outputted or an intervention should not be performed, respectively, in order to ensure adequate system stability.

If all three checking steps are decided with "yes", a potentially hazardous situation and unintentional drifting has been detected, and driver inactivity is also present. This causes a warning signal to be outputted and/or a driving intervention to be performed, wherein the warning and/or intervention strategy can also proceed in steps, as already described above.

A certain adaptation to the driver can occur over time as part of the signaling or the intervention, respectively. For example, when it is determined during the current travel that the driver is very active, i.e. drives relatively consciously far to the left towards the lane marker, or moves relatively close to the vehicle ahead, etc., an adaptation can be made in that any signaling or intervention occurs a little later, compared with a relatively inactive driver, who obviously needs more support.

It is also possible that a driver according to his "classification active driving/inactive driving" may or may not more or less "cut corners" on a country road, without the need for an operational intervention, because this is ultimately in conformance with the driver's wishes commensurate with his driving style. These "special parameters" can in particular be included within the context of detecting the driver activity, but also within the context of detecting the lane marker, wherein particularly route information which can be read, for example, from a storage medium of a navigation system relating the currently travelled route, and from which, for example, information about the course of the lane, in particular in view of curve radii, etc., may be derived.

Figure 2:
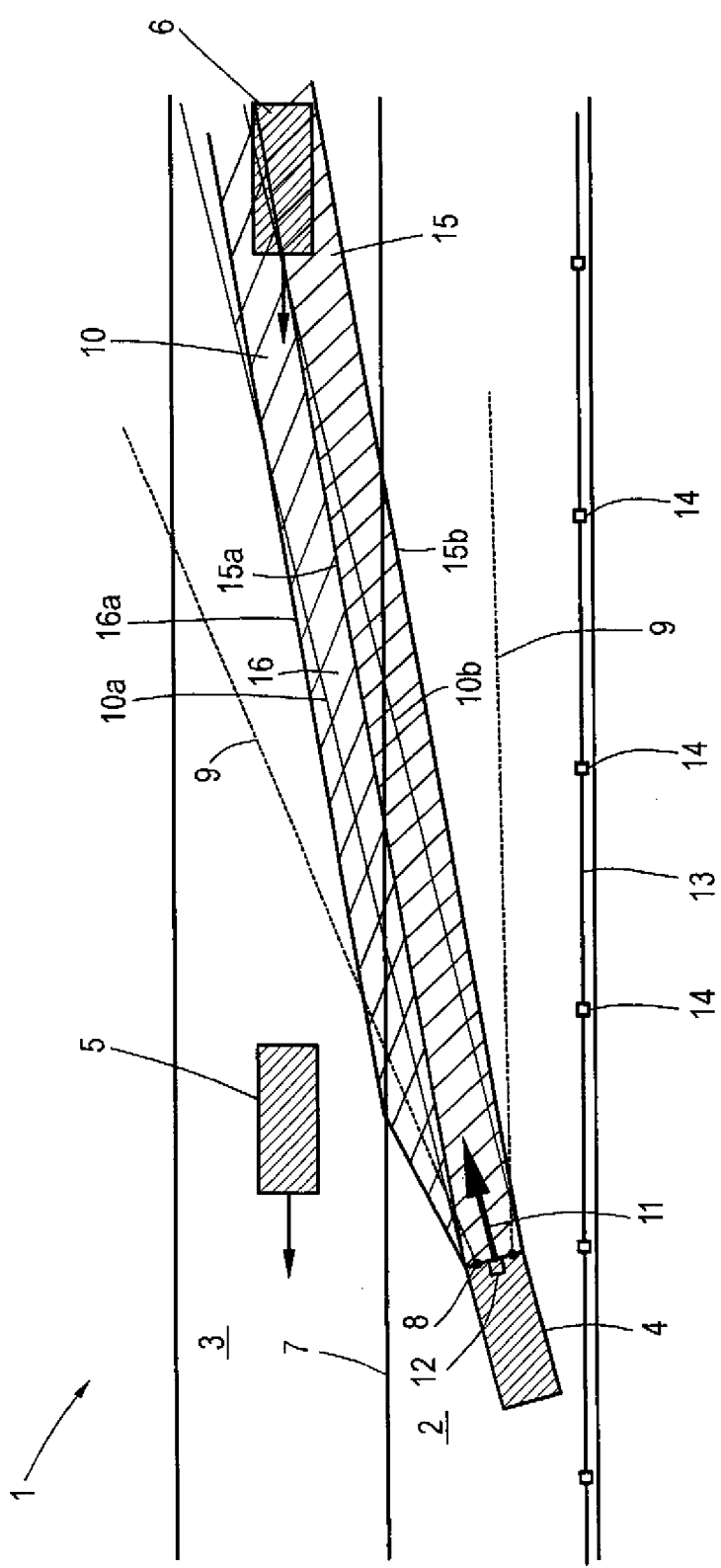
FIG. 2 is a schematic diagram illustrating the positioning of the vehicle path and the detection of the oncoming traffic.

FIG. 2 shows a schematic diagram describing the capture of any oncoming traffic and its relevance regarding a collision. Shown is a roadway 1 with two lanes 2, 3, wherein the lane 2 is traveled by the own vehicle 4, whereas a first oncoming vehicle 5 and a second oncoming vehicle 6 travel in the opposing traffic lane 3.

The own vehicle 4 does not travel parallel to the longitudinal lane direction, but—exaggerated here—at a slight angle, so that it ultimately travels towards a lane marker 7 separating the own lane 2 from the opposing traffic lane 3.

To detect any oncoming traffic, the system makes use of different sensors 8, in the present case preferably radar sensors, which sense the area in front of the vehicle and detect any objects in its capture area represented by the dashed lines 9. Information about the distance to the objects as well as the relative speed, etc., can be determined from the sensor signals.

In the illustrated example, the oncoming vehicle 5 is outside the detection range 9, whereas the oncoming vehicle 6 is basically in the detection range and therefore detected. Because it is a moving object, it can be reliably detected based on the time profile of the sensor signals.

In order to detect whether the oncoming traffic object 6 actually represents a potential collision object, the system determines a virtual vehicle path 10 (in the figure bounded by lines 10a, 10b) in the travel direction 11 of the vehicle 4. This predicted vehicle path 10 indicates the movement corridor in which the vehicle 4 will potentially move in the near future. Its position and orientation, respectively, depends on the own position and the longitudinal orientation of the vehicle 4, since it is inherently oriented parallel, i.e. in the direction of the vehicle's longitudinal axis.

The "uncorrected" vehicle path 10 is now preferably "stationary target-weighted," i.e. its position is corrected using information concerning stationary targets. The reasoning behind this is that the predicted course of the lane of a "drifting" vehicle means that the vehicle path 10 also tends to drift. A correction based on information concerning stationary targets prevents the vehicle path from being estimated as too far "outside", i.e. towards the opposing traffic lane, which would later cause oncoming traffic objects to be incorrectly classified as relevant or not relevant. Fixed environment objects, such as a guard rail 13 or road boundary posts 14, are then captured by using, for example, an optical sensing means such as a camera 12 and/or environment sensors, such as in particular radar with a considerable range. In this way, it can now be reliably detected how the own vehicle is positioned relative to these stationary targets, and ultimately where the opposing traffic lane 3 is located. Based on this information, the vehicle path can then be corrected and in the illustrated example quasi "pulled down." The corrected vehicle path indicated as 15 is delimited on the side by the lines 15a, 15b. It is obviously tilted relative to the uncorrected vehicle path 10. Especially the radar data, which are particularly suited for capturing stationary targets, are suitable for correcting the vehicle path, because the course of the road can be particularly well reproduced based on the radar data.

An additional virtual "oncoming traffic corridor" is spanned for this corrected vehicle path 15, i.e. the vehicle path 15 is extended laterally towards the opposing traffic lane 3. This "oncoming traffic corridor" 16 is also indicated in FIG. 2 and is laterally delimited—graphically by the line 15a to the vehicle path 15 and the line 16a.

Overall, a "total vehicle path" composed of the corrected vehicle path 15 and the oncoming vehicle path 16 is thus formed.

It is determined based on the sensor signals from the radar sensors 8, whether or not an oncoming traffic object, here the oncoming vehicle 6, is located in this common vehicle path. In the illustrated case, this applies to the oncoming traffic object 6, which means that the latter is already in the vehicle path and may consequently also represent a potential collision object. Therefore, if in this scenario the two additional key criteria, namely a lane marker and a drift of the vehicle 4 towards this lane marker as well as a driver activity are positively detected, this can prompt a warning or a driving intervention, respectively.

Figure 3:
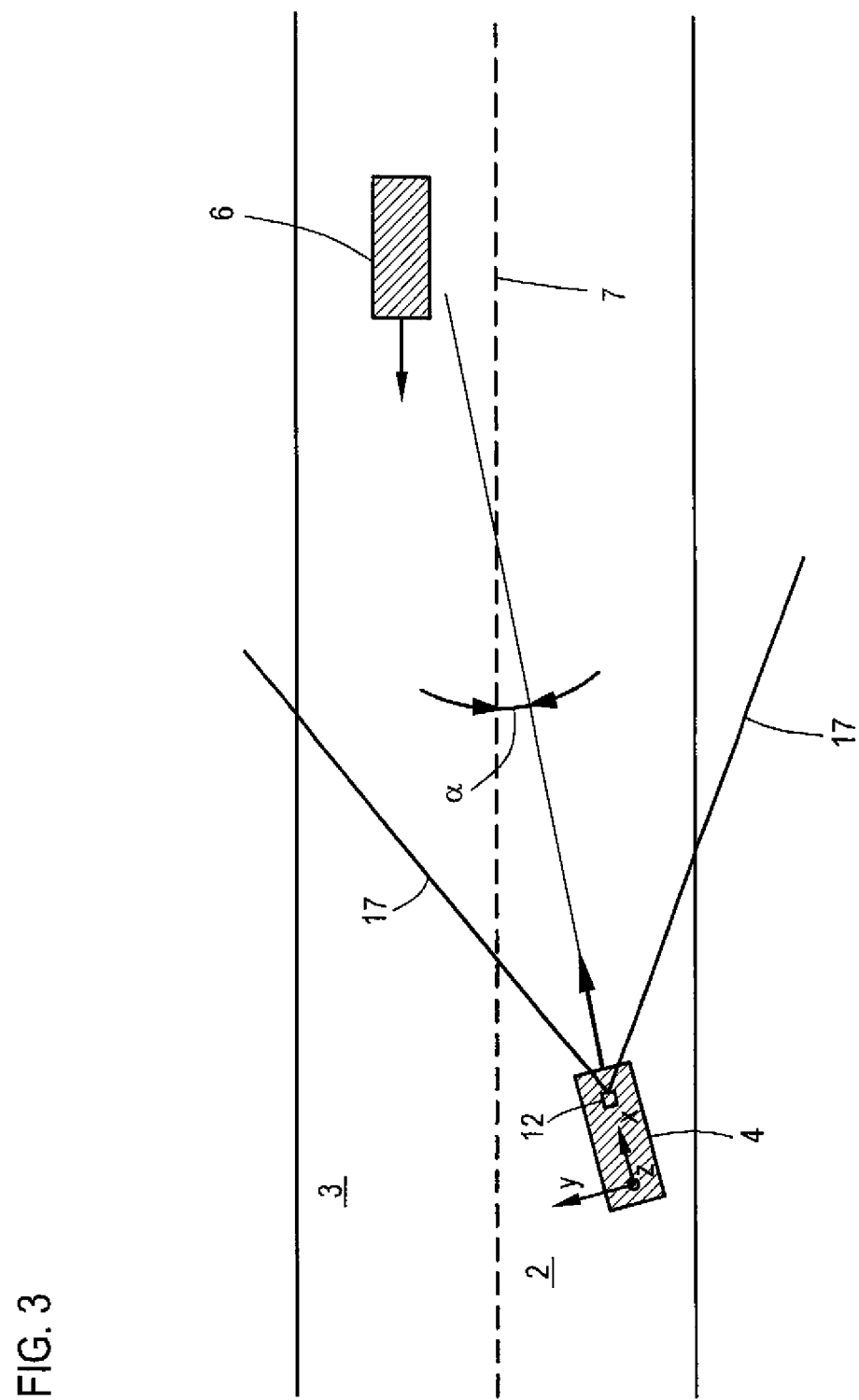
FIG. 3 is a schematic diagram describing the detection of the relevant lane marker and a possible drift.

Determining a relevant lane marker that definitely separates the own lane 2 from the opposing traffic lane 3, i.e. the lane marker 7, is shown in FIG. 3. Illustrated is here again the own vehicle 4 with its optical detection device, in this case the camera 12, which captures area in front of the vehicle. The detection range is indicated by the two lines 17. The lane marker 7 can then be detected in the individual video images by using a suitable image analysis unit. This lane marker 7 must, on one hand, be classified as that lane marker which actually separates the own lane 2 from the opposing traffic lane 3; this may optionally also be done based on environment information regarding stationary objects, or information regarding oncoming traffic objects and the like. In any case, this lane marker 7 must be acquired with sufficient stability over a certain time; it must also be ensured that the lateral displacement of the own vehicle 4 relative to the lane marker 7, i.e. the lateral offset of the vehicle 4 relative to the mark 7, is sufficiently stable and has no jumps or dropouts. This means that the own vehicle 4 travels steadily for a specific time within a certain tolerance range with a lateral offset to the marker 7. It can be deduced therefrom that the own vehicle 4 has traveled directionally stable with respect to this relevant lane marker 7 in advance of a possibly later detected drift.

For detecting a possible drift, the temporal behavior of the own vehicle 4 with respect to the lane marker 7 is then determined, i.e. whether the lateral offset varies or whether a yaw angle is adjusted relative to the lane marker 7, as shown by the angle α in the illustrated example. This yaw angle α is the angle enclosed between the extended longitudinal axis, in the illustrated example the x-axis of the vehicle 4, and the course of the lane marker 7. A possible drift is derived therefrom; it can also be predicted therefrom when the lane marker 7 is crossed. The y-axis is used as the basis for determining the course of the lateral offset, i.e. the described directional stability ahead of a possible drift.

Line attributes can be used for determining the lane marker 7, which can be read, for example, from the route data of a navigation DVD for the traveled lane. The appearance of the lane marker may optionally be inferred therefrom, for example when the road is a country road with typically broken markers, which may be continuous in areas where passing is prohibited, etc. This information may be considered in the context of determining the relevant line or marker to determine whether the detected mark actually separates the own lane from an opposing traffic lane.

Figure 4:
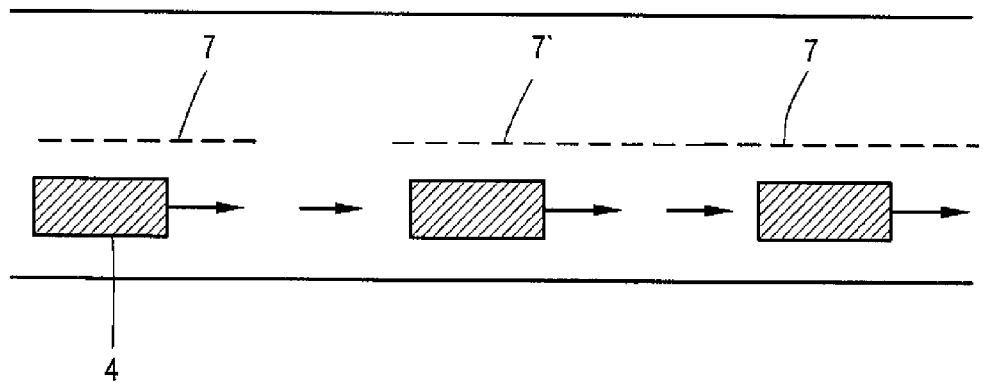
FIG. 4 is a schematic diagram describing the detection of a lane marker, and its relevance.

As described above, it is imperative for a possible warning signal or an intervention that the relevant lane marker 7 is detected with sufficient stability and plausibility. There must not be an interruption or uncertainty in the detected result under any circumstances. FIG. 4 shows a typical exemplary acquisition scenario. The vehicle 4 travels initially in an area where the relevant lane marker 7 was reliable detected and virtually "identified" as relevant, as indicated by the slightly thicker representation 7. The lane marker 7 obviously ends when travel continues, because it either does no longer exist (e.g. due to road work), or because it has worn off and a reliable detection is no longer possible with the optical detection sensors. A lane marker 7' that may be relevant as lane marker 7 is identified again only when travel continues; however, it has not yet been acquired with sufficiently stability and can therefore not be used as a definite lane marker, which only becomes possible when the lane marker is 7' is continuously detected for a predetermined time period. Only then can the lane marker 7' be viewed as well tested and be used as relevant lane marker 7, because only then is an unambiguous line position defined for a given time window and a stable driving state of the own vehicle 4 (directional stability) is determined. The lane marker 7 is represented again by a somewhat heavier line, after it has been judged to be relevant and well tested.

The entire system is inactive within the time window beginning with the termination of the acquisition of the line 7 until the renewed relevance of the line 7, and a possible warning is not generally possible, even when the other conditions are met.

Figure 5:
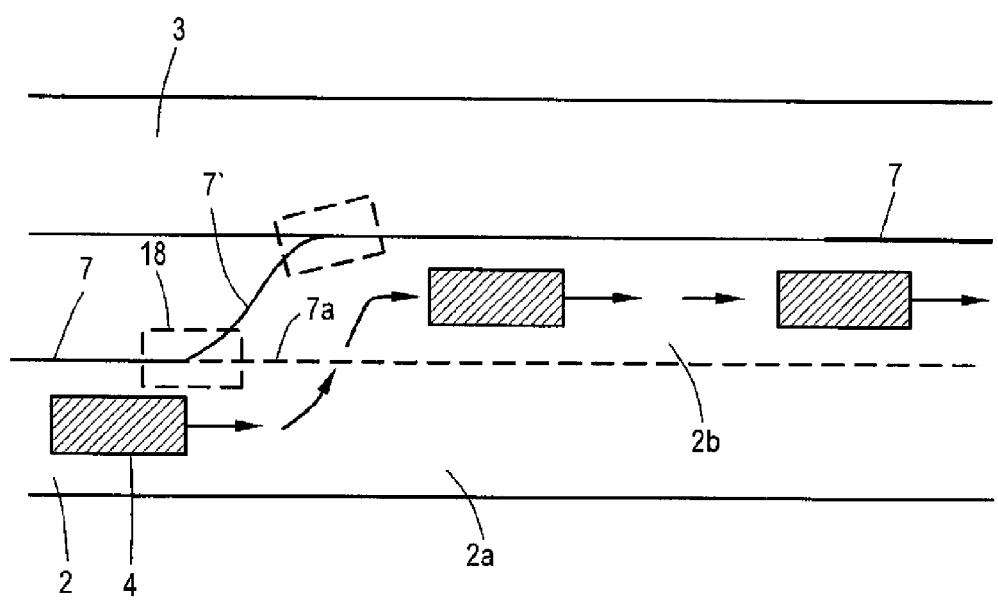
FIG. 5 is a schematic diagram describing each another situation relating to the capture of a relevant lane marker.

FIG. 5 finally shows a lane scenario which also exhibits an instability of the lane marker detection. Starting from the condition where the own vehicle 4 travels with directional stability next to a detected relevant lane marker 7, which is detected with sufficient stability, the area of the own lane 2 is expanded, meaning that the own travel lane 2 expands into a first lane 2a and a second lane 2b. An instability occurs in the area of lane marker 7, as shown in FIG. 5, because the lane marker 7 changes, on the one hand, its direction as indicated by continuing line 7' and, on the other hand, another lane marker 7a is added which subsequently separates the two lanes 2a, 2b from each other.

This means that an instability in the lane markers 7 and 7' exists in the transition region due to the change in the course of the lines, i.e. that an additional lane marker 7a is added, so that no unambiguous line position exists from this point on.

To be able to detect such an ambiguity, a search window 18, which extends both longitudinally and laterally around the lane marker 7, is placed around the originally stably detected lane marker 7. When a discontinuity regarding the lane marker 7 occurs in the search window 18, as indicated by the course of the marker 7', and/or when another marker appears, here the marker 7a, the original relevant lane marker 7 is immediately "deleted", i.e. is treated as irrelevant, the line position is no longer plausible, and the system is no longer operational. The vehicle 4 then continues its travel according to the arrows, changing from the lane 2a to the lane 2b. It is then continuously checked, whether a lane marker is detected. Because the vehicle travels substantially along the lane marker 7', the lane marker 7' will again be detected no later than when the vehicle 4 has crossed over to the lane 2b and moves parallel to the lane marker 7'. However, the line must here again be unambiguously detected during a predetermined time window, i.e. the lane marker 7' must be definitely identified over a sufficiently long time, and the lateral displacement of the own vehicle in relation to this line must be sufficiently stable. The lane marker 7' is judged to be a relevant lane marker 7 only when this condition is satisfied, as shown in the right part of the image in FIG. 5. The lane marker 7 is consequently classified as the lane marker that unambiguously separates the own lane 2b from the opposing traffic lane 3. A warning signal, etc., may once more be outputted when oncoming traffic is again detected in the (here unillustrated) vehicle path and inactivity has been detected.

The motor vehicle 4 includes of course a suitable control and evaluation device, which usually in communicates with other control devices and sensor devices, respectively, and which performs the corresponding data processing and initiates appropriate actions, when required.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for warning a driver of a motor vehicle of an impending hazardous situation caused by accidental drifting towards or into an opposing traffic lane, the method comprising:
   determining a virtual vehicle corridor defining a width and directed in the travel direction of the own motor vehicle,
   determining with a first detection sensor a lane marker separating the lane of the own motor vehicle from the opposing traffic lane,
   determining a relative position of the own motor vehicle in relation to the lane marker,
   determining an oncoming vehicle traveling on the opposing traffic lane with a second detection sensor,
   checking whether the oncoming vehicle enters or has entered the virtual vehicle corridor,
   checking whether the own motor vehicle will travel across or has traveled across the lane marker based on the determined relative position of the own motor vehicle,
   checking for presence of additional sensor information indicating an active travel operation or a steering operation by the driver, thus indicating that the detected relative position of the own motor vehicle is caused by driver activity, and
   outputting a warning signal or performing an automatic driving mode intervention, or both, when a result of the checking indicates that the oncoming vehicle will enter or has entered into the virtual vehicle corridor and the own vehicle will cross or has crossed the lane marker, thus making a collision likely, and when the sensor information indicates an absence of an active steering operation by the driver,
   wherein the warning signal is outputted or the automatic driving mode intervention is performed only when no additional marker located proximate to the lane marker separating the own lane from the opposing traffic lane is detected during a predetermined or adaptable time period.

2. The method of claim 1, wherein the first detection sensor is an optical sensor.

3. The method of claim 1, wherein the second detection sensor is a radar sensor.

4. The method of claim 1, wherein the virtual vehicle corridor is displaced laterally in the direction of the opposing traffic lane.

5. The method of claim 1, wherein the vehicle corridor is detected based on environment information relating to stationary objects captured with the first detection sensor.

6. The method of claim 1, wherein a likelihood of a collision of the own vehicle with the oncoming vehicle is determined by measuring a distance between the own vehicle and the oncoming vehicle and from information describing a relative movement of the own vehicle and the oncoming vehicle with respect to one another as well as existing information describing a movement of the own vehicle, and a likely virtual impact time is determined.

7. The method of claim 1, wherein the warning signal is outputted or the automatic driving mode intervention is performed only when the lane marker separating the own lane from the opposing traffic lane is detected continuously during a predetermined time period.

8. The method of claim 1, wherein an instance of the own motor vehicle crossing the lane marker is detected, wherein the warning signal is outputted or the automatic driving mode intervention is performed only from this instance on.

9. The method of claim 1, wherein information obtained with the first and second detection sensor or with an onboard camera comprises at least one of operating a turn signal, actuating an accelerator, actuating a brake pedal, turning a steering wheel, a steering angle, a steering angle gradient, a steering torque, an acceleration value, a deceleration value, an actual driving speed located within a predetermined interval, an actual driving speed located within an adjustable interval, a time gap indicating a distance between the own vehicle and a preceding vehicle, and an observation of the driver acquired with the onboard camera.

10. The method of claim 1, wherein additional information, based on which the warning signal is outputted or the automatic driving mode intervention is performed, comprises at least one of a curve radius of the travel lane determined with the first detection sensor, a value of a lane width located between a minimum value and a maximum value, and an actual speed of the oncoming vehicle with respect to a threshold value.

11. The method of claim 1, wherein additional information, based on which the warning signal is outputted or the automatic driving mode intervention is performed, comprises route information from an onboard or external database.

12. The method of claim 1, wherein additional information, based on which the warning signal is outputted or the automatic driving mode intervention is performed, comprises route information from a navigation system.

13. The method of claim 1, wherein the warning signal comprises at least one of an optical, acoustic and haptic warning signal.

14. The method of claim 1, wherein the automatic driving mode intervention comprises applying a steering torque back in a direction of the own traffic lane or applying a braking torque to an individual wheel that drives the own vehicle in the direction of the own traffic lane.

15. The method of claim 1, wherein the warning signal is outputted or the automatic driving mode intervention is performed in a cascaded fashion such that in a first stage a visual or audible warning signal is outputted, in a second stage a haptic warning signal is outputted, in a third stage a steering torque is applied and in a fourth stage a braking torque is applied, wherein the steering torque and the braking torque drive the own vehicle in the direction of the own traffic lane.

16. The method of claim 4, wherein the virtual vehicle corridor is weighted by a distance between the own motor vehicle and the oncoming vehicle.

17. The method of claim 5, wherein the stationary objects comprise at least one of crash barriers and lane markers.

18. The method of claim 6, wherein the information describing the relative movement comprises a relative speed or a relative acceleration, or both.

19. The method of claim 7, wherein the predetermined time period is adaptable.

20. The method of claim 15, wherein a respective stage is selected depending on a detected danger situation.

21. A motor vehicle, comprising:
- a first detection sensor configured to determine a virtual vehicle corridor defining a width and directed in the travel direction of the own motor vehicle, to determine a lane marker separating the lane of the own motor vehicle from an opposing traffic lane, and to determine a relative position of the own motor vehicle in relation to the lane marker,
- a second detection sensor configured to determine an oncoming vehicle traveling on the opposing traffic lane, to determine whether the oncoming vehicle enters or has entered the virtual vehicle corridor, and to determine whether the own motor vehicle will travel across or has traveled across the lane marker based on the determined relative position of the own motor vehicle,
- a monitoring device configured to check for presence of additional sensor information indicating an active travel operation or a steering operation by the driver, thus indicating that the detected relative position of the own motor vehicle is caused by driver activity, and
- a warning device configured to output a warning signal or perform an automatic driving mode intervention, or both, when it is determined that the oncoming vehicle will enter or has entered into the virtual vehicle corridor and that the own vehicle will cross or has crossed the lane marker, thus making a collision likely, and when the sensor information from the monitoring device indicates an absence of an active steering operation by the driver,
- wherein the warning signal is outputted or the automatic driving mode intervention is performed only when no additional marker located proximate to the lane marker separating the own lane from the opposing traffic lane is detected during a predetermined or adaptable time period.

\* \* \* \* \*